United States Patent
Sheng et al.

(10) Patent No.: US 9,948,814 B2
(45) Date of Patent: Apr. 17, 2018

(54) SCANNING DEVICE (71) Applicant: Avision Inc., Hsinchu (TW)

(72) Inventors: Shao-Lan Sheng, Hsinchu (TW); Chi-Yao Chen, Hsinchu (TW)

(73) Assignee: Avision Inc (TW)

( * ) Notice: Subject to any disclaimer, the term of this patent is extended or adjusted under 35 U.S.C. 154(b) by 0 days.

(21) Appl. No.: 15/408,082

(22) Filed: Jan. 17, 2017

(65) Prior Publication Data
US 2018/0020114 A1  Jan. 18, 2018

(30) Foreign Application Priority Data
Jul. 18, 2016  (TW) .............................. 105122657 A (51) Int. Cl.
H04N 1/04 (2006.01)
H04N 1/10 (2006.01)
H04N 1/00 (2006.01)

(52) U.S. Cl.
CPC ....... H04N 1/1061 (2013.01); H04N 1/00588 (2013.01); H04N 2201/0081 (2013.01)

(58) Field of Classification Search
CPC ............. H04N 1/1061; H04N 1/00588; H04N 2201/0081
USPC ........................ 358/497, 498, 474
See application file for complete search history.

(56) References Cited

U.S. PATENT DOCUMENTS 7,342,694 B2 *  3/2008  Kusunose ............ H04N 1/0057
                                                    358/401
8,072,655 B2 * 12/2011  Park ...................... H04N 1/121
                                                    358/474

FOREIGN PATENT DOCUMENTS

TW      200742406 A    11/2007
TW      M442276 U1     12/2012
TW      M518851 U       3/2016

* cited by examiner

Primary Examiner — Houshang Safaipour (57) ABSTRACT

The disclosure provides a scanning device including a flatbed scanner and an ADF. The flatbed scanner includes a first body, a transparent substrate disposed on top surface of the first body, a first film disposed on top surface of the transparent substrate, and an image capturing module disposed under bottom surface of the transparent substrate. The ADF includes a second body, a backplane disposed at bottom of the second body for covering top surface of the flatbed scanner, a paper passage disposed inside the ADF, and a second film. An open portion is configured in the paper passage corresponding to top surface of the transparent substrate, and results communication between the paper passage and top surface of the transparent substrate. The second film is disposed at paper entrance of the open portion. Wherein, the first film and the second film are not overlap on top surface of the transparent substrate.

13 Claims, 10 Drawing Sheets

SCANNING DEVICE

The current application claims a foreign priority to application number 105122657 filed on Jul. 18, 2016 in Taiwan.

BACKGROUND OF THE INVENTION

Field of the Invention

The present disclosure relates to a scanning device, and more particularly, the present disclosure relates to a scanning device having functions of flatbed scan and feed-in scan.

Description of Related Art

In prior art, the scanning device is composed by a flatbed scanner and a auto document feeder, wherein papers are placed on the flatbed scanner horizontally for scanning, and also can be scanned by auto document feeder.

Figure 1:
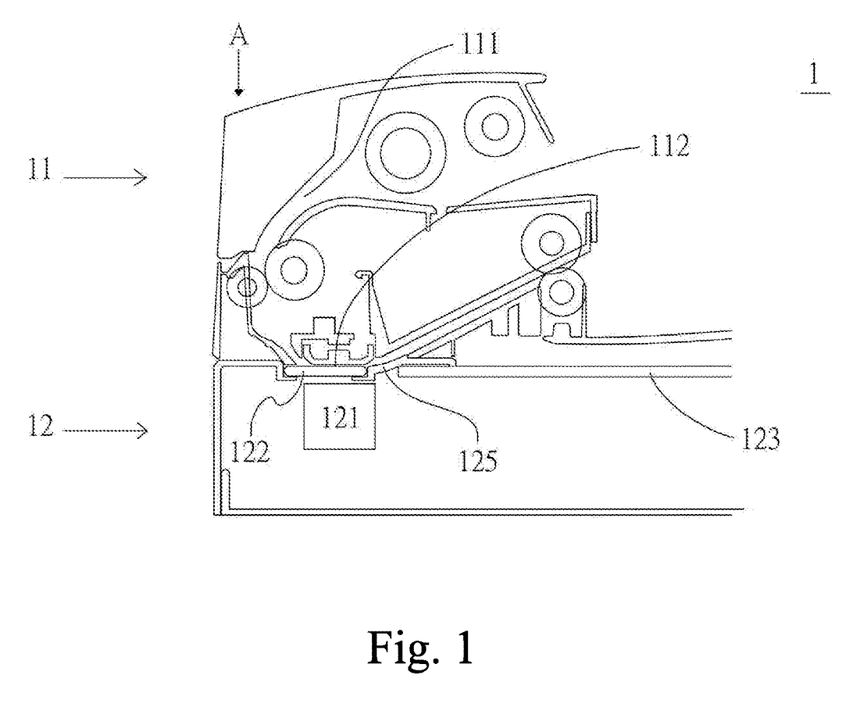
FIG. 1 is a schematic view illustrating a scanning device in the prior art.

FIG. 1 is a schematic view illustrating a scanning device in the prior art. Referring to FIG. 1, in the scanning device 1 of prior art, the flatbed scanner 12 share a image capturing module 121 with the auto document feeder 11. Due to the share of the image capturing module 121, the image capturing module 121 is disposed inside the first end A of the flatbed scanner 12. Correspondingly, the auto document feeder 11 is also disposed on the first end A of the flatbed scanner 12. In addition, a open portion 112 is configured in the location where being inside the paper passage 111 of the auto document feeder 11 which being close to the flatbed scanner 12. Therefore, image of papers transported in paper passage 111 can be captured by the image capturing module 121 when papers pass the open portion 112.

The design of prior art applies a first transparent substrate 122, a connecting portion 125, and a second transparent substrate 123 in structure. The first transparent substrate 122 can provide assistances of the image capturing module 121 for capturing image of papers transported in paper passage 111 when papers pass the open portion 112. The second transparent substrate 123 provide assistances for of capturing image of papers placed on the flatbed scanner 12 horizontally, and the connecting portion 125 is applied to connect the first transparent substrate 122 and the second transparent substrate 123. Wherein, when papers transported in paper passage 111 pass the open portion 112, top surface of the connecting portion 125 is presented the design of upward oblique and extended to the passage wall of the paper passage 111, which results the papers return to the paper passage 111. Therefore, thickness of the first transparent substrate 122 is thinner than thickness of the second transparent substrate 123. From the view of the flatbed scanner 12, top surface of the first transparent substrate 122 is lower than the top surface of the second transparent substrate 123, and presents a design of hollow structure for transporting papers smoothly without constructive interference of the first transparent substrate 122.

In prior art, in order to integrate a flatbed scanner 12 and a auto document feeder 11 to share one image capturing module 121, multiple elements are need to apply in the structural design of the flatbed scanner 12, and a space is needed inside the flatbed scanner 12 additionally for accommodating the first transparent substrate and the connecting portion, which results the size of the scanning device become larger.

SUMMARY OF THE INVENTION

Accordingly, an object of the present disclosure is to provide a scanning device to further integrating the operation of the flatbed scanner and the auto document feeder, and reduce the length of the flatbed scanner and the size of the scanning device.

To achieve the foregoing and other objects, a scanning device is provided for capturing image of papers by the way of flatbed scan and automatic-feed scan. The scanning device of the present disclosure comprises a flatbed scanner and a auto document feeder. The flatbed scanner comprises a first body, a transparent substrate, a first film, and a image capturing module. The transparent substrate is disposed on the first body. The first film is disposed at a first end of top surface of the transparent substrate. The image capturing module is disposed at the first end of bottom surface of the transparent substrate. The auto document feeder comprises a second body, a backplane, a paper passage, and a second film. The backplane is disposed at bottom of the second body for covering top surface of the flatbed scanner. The paper passage is disposed inside the second body, and a open portion is configured in the location corresponding to the first end of top surface of the transparent substrate for resulting communication between the paper passage and top surface of the transparent substrate. The second film is disposed at paper entrance of the open portion. Wherein, the first film and the second film are not overlap on top surface of the transparent substrate.

From above, the present disclosure just only needs one transparent substrate, and not requires a connecting portion to integrate the connecting relation of two transparent substrates additionally. Thus, compared to the scanning device of prior art, the present disclosure can save the space of the first transparent substrate and the connecting portion showed in prior art by the length design of the present scanning device, thereby achieves the effect of shortening length and reducing volume.

BRIEF DESCRIPTION OF THE DRAWINGS

Other features and advantages of the present disclosure will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 2:
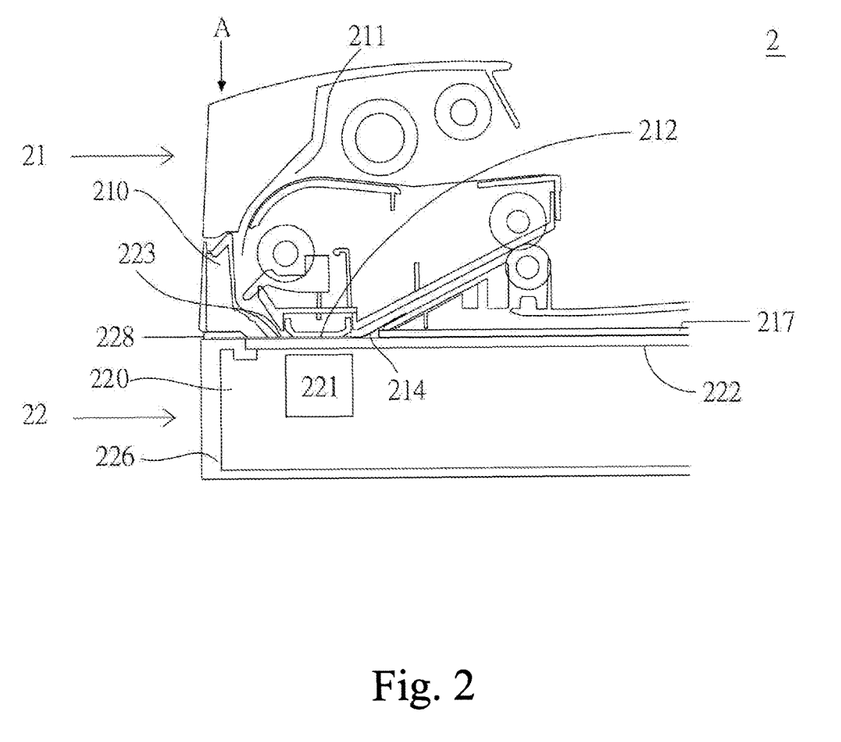
FIG. 2 is a schematic view illustrating a scanning device of the present disclosure.

Referring to FIG. 2, FIG. 2 is a schematic view illustrating the scanning device of the present disclosure. In the present disclosure, a scanning device 2 is provided for capturing image of papers by the way of flatbed scan and automatic-feed scan. The scanning device 2 comprises: a flatbed scanner 22 and a auto document feeder 21. The flatbed scanner 22 comprises a first body 220, a transparent substrate 222, a first film 223, and a image capturing module 221. Wherein, the transparent substrate 222 is disposed on top surface of the first body 220, and the first film 223 is disposed at a first end first end A of top surface of the transparent substrate 222. In addition, the image capturing module 221 is disposed at the first end A of bottom surface of the transparent substrate 222.

From above, the auto document feeder 21 of the present embodiment comprises a second body 210, a backplane 217, a paper passage 211, and a second film 214. The backplane 217 is disposed at bottom of the second body 210 for covering top surface of the flatbed scanner 22. The paper passage 211 disposed inside the second body 210, and a open portion 212 is configured in the location corresponding to the first end A of top surface of the transparent substrate 222 for resulting communication between the paper passage 211 and the first end A of top surface of the transparent substrate 222. The second film 214 is disposed at paper entrance of the open portion 212. Wherein, the second film 214 and the first film 223 are not overlap on top surface of the transparent substrate 222. In the present disclosure, the image capturing module 221 can be a scanning module with Charge-coupled device type image sensor (CCD type image sensor) or Contact Image Sensor (CIS).

Wherein, when the backplane 217 covers top surface of the flatbed scanner 22, endpoint of the first film 223 closed to endpoint of the second film 214 is higher than endpoint of the second film 214. Therefore, when papers are transported in paper passage and pass through the first film 223 located in the open portion 212, papers will return to the paper passage 214 through the disposition of the second film 214.

Worth mention, the flatbed scanner 22 further comprises a housing 226 applied for carrying the transparent substrate 222. Wherein, due to the disposition of housing 226, the flatbed scanner 22 can support the weight of the auto document feeder 21.

As shown in FIG. 2, the flatbed scanner 22 further comprises a cover 228. Wherein, one end of the cover 228 is wedged on the housing 226, another end of the cover 228 presses on the partial of the first film 223. Thus, the first film 223 can be fixed on the transparent substrate 222 effectively and stably. In other words, the first film 223 will not be move by the influences of papers friction.

In the present embodiment, in order to make the distance of image capturing match the design standard, thickness of the first film 223 is between 0.2-0.5 mm, and thickness of the second film 214 is less than 0.2 mm. Wherein, thickness of the second film 214 is less than thickness of the first film 223. This design can prevent the interference of the second film 214 and make papers transport smoothly when papers are transported in the paper passage 211. In other words, the present design makes papers transport smoothly through the second film 214 located in the open portion 212. Worth mention, the preferred thickness of the first film 223 is 0.3 mm.

Wherein, the second film 214 can be a flexible film, and has a suitable elasticity. The second film 214 is extended from the paper passage 211. Therefore, when the flatbed scanner 22 and the auto document feeder 21 are connected to be a close state, the second film is bended and leaned against transparent substrate 222 elastically.

Figure 3:
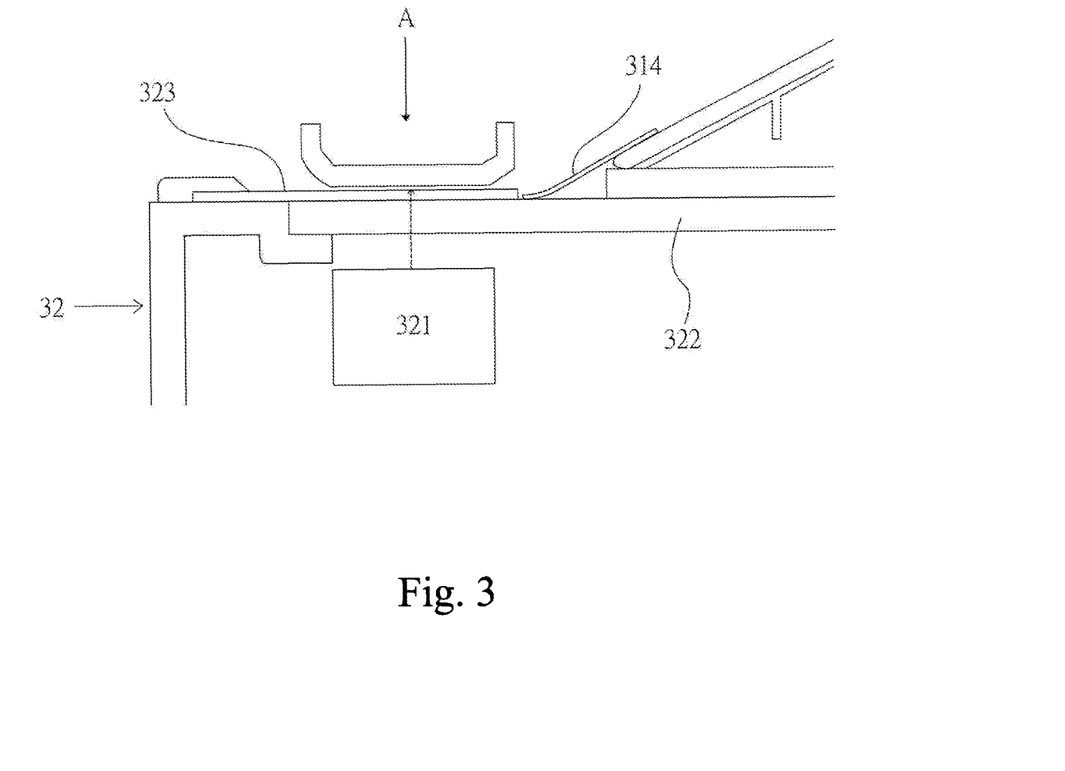
FIG. 3 is a schematic view illustrating the scanning device of the first embodiment in the present disclosure.

Referring to FIG. 3, FIG. 3 is a schematic view illustrating the scanning device of the first embodiment in the present disclosure. A adhesive layer (not shown) is disposed between the first film 323 and the transparent substrate 322, the adhesive layer is transparent and has a good transmittance. The first film 323 can attach on the transparent substrate 322 stably by the adhesive layer. Worth mention, in the first embodiment, when the image capturing module 321 is disposed on the surface of transparent substrate 322 which being opposite the first film 323 for capturing image of papers transported in the paper passage 211, the first film 323 is a transparent film.

Figure 4:
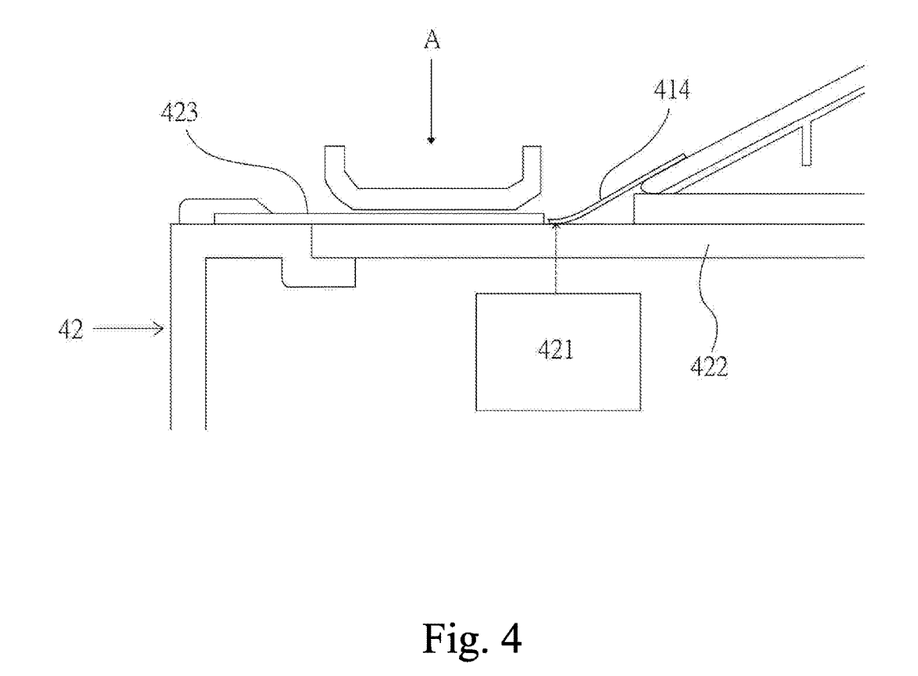
FIG. 4 is a schematic view illustrating the scanning device of the second embodiment in the present disclosure.

Referring to FIG. 4, FIG. 4 is a schematic view illustrating the scanning device of the second embodiment in the present disclosure. A adhesive layer (not shown) is disposed between the second film 414 and the housing of the paper passage, the second film 414 is transparent and has a good transmittance. The second film 414 can attach on the housing of the paper passage by the adhesive layer. Worth mention, in the second embodiment, when the image capturing module 421 is disposed on the surface of the transparent substrate 422 which being opposite the second film 414 for capturing image of papers transported in the paper passage, the second film 414 is a transparent film. At this time, the image capturing module 421 processes the image capturing operation of papers transported in the paper passage through the transparent substrate 422 and one end of the second film 414 disposed on transparent substrate 422.

Figure 5:
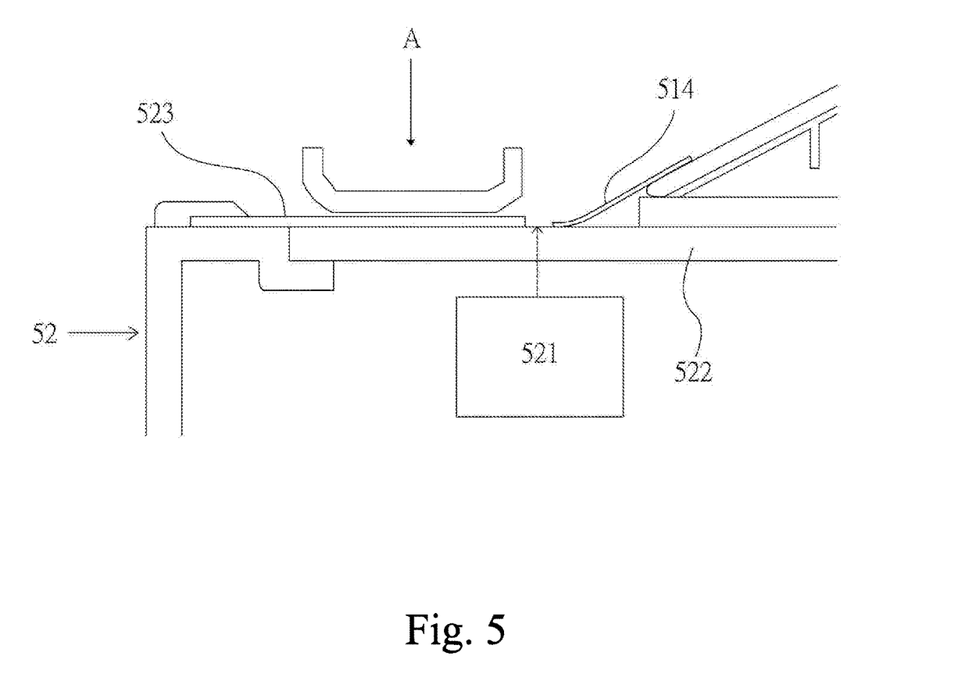
FIG. 5 is a schematic view illustrating the scanning device of the third embodiment in the present disclosure.

Referring to FIG. 5, FIG. 5 is a schematic view illustrating the scanning device of the third embodiment in the present disclosure. In the present embodiment, the first film 523 is not connected to the second film 514, the image capturing module 521 is disposed on the surface of the transparent substrate 522 which being opposite the non-overlapping location between the first film 523 and the second film 514 for capturing image of papers transported in the transparent substrate 522.

Figure 6A:
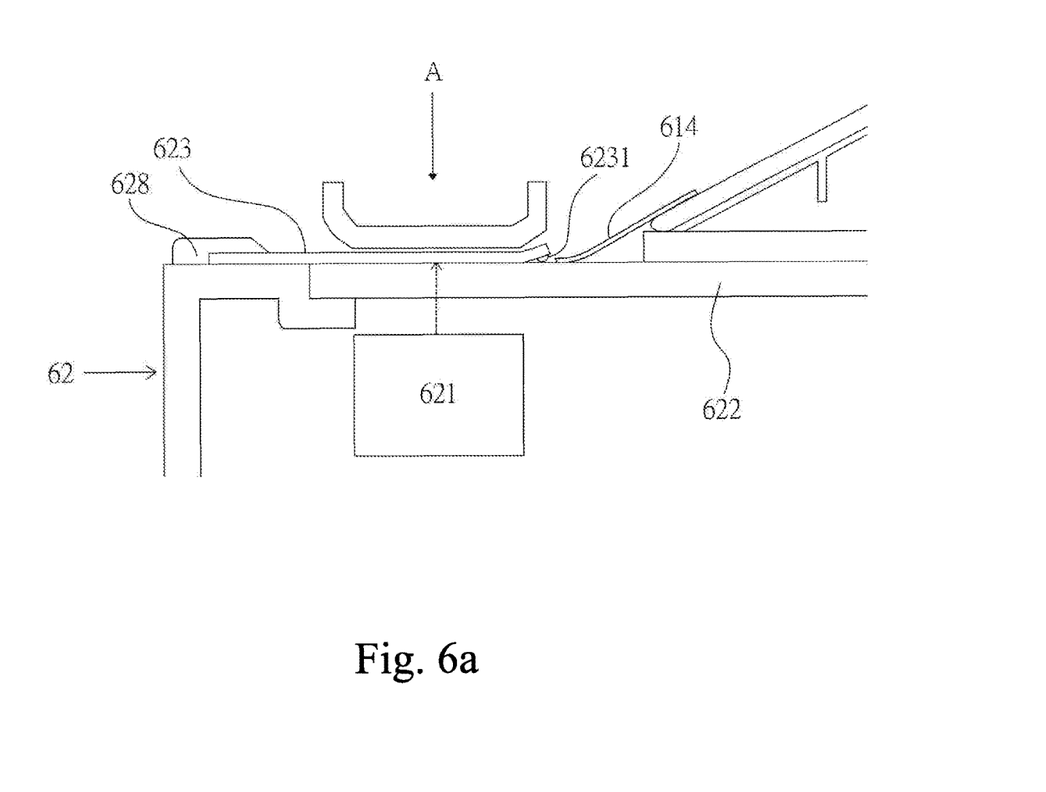
FIG. 6a is a schematic view illustrating the scanning device of the fourth embodiment in the present disclosure.
Figure 6B:
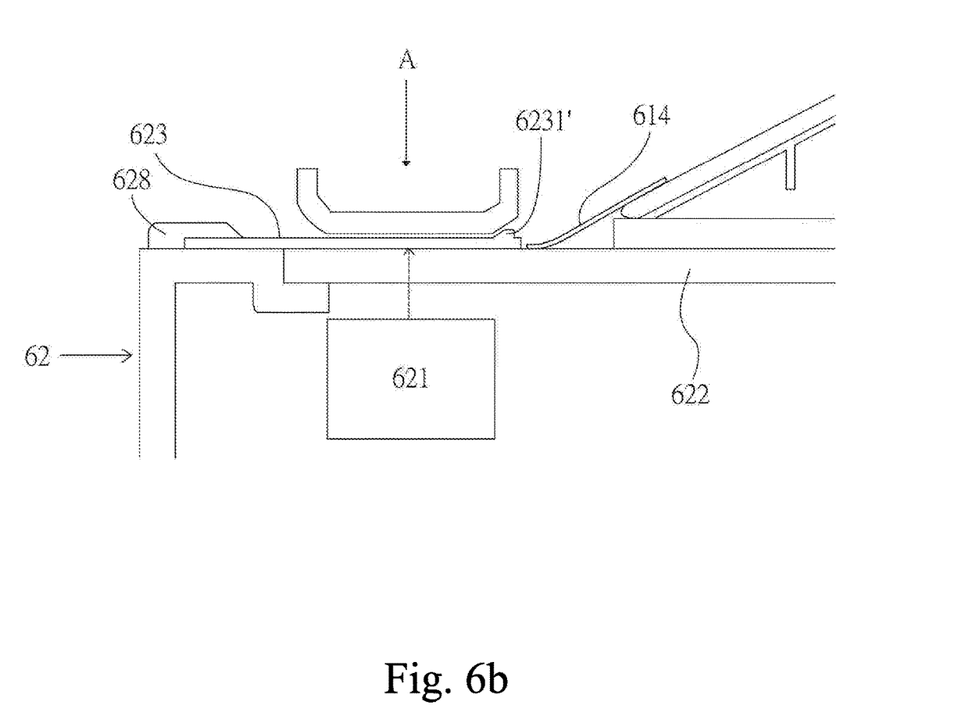
FIG. 6b is another schematic view illustrating the scanning device of the fourth embodiment in the present disclosure.
Figure 6C:
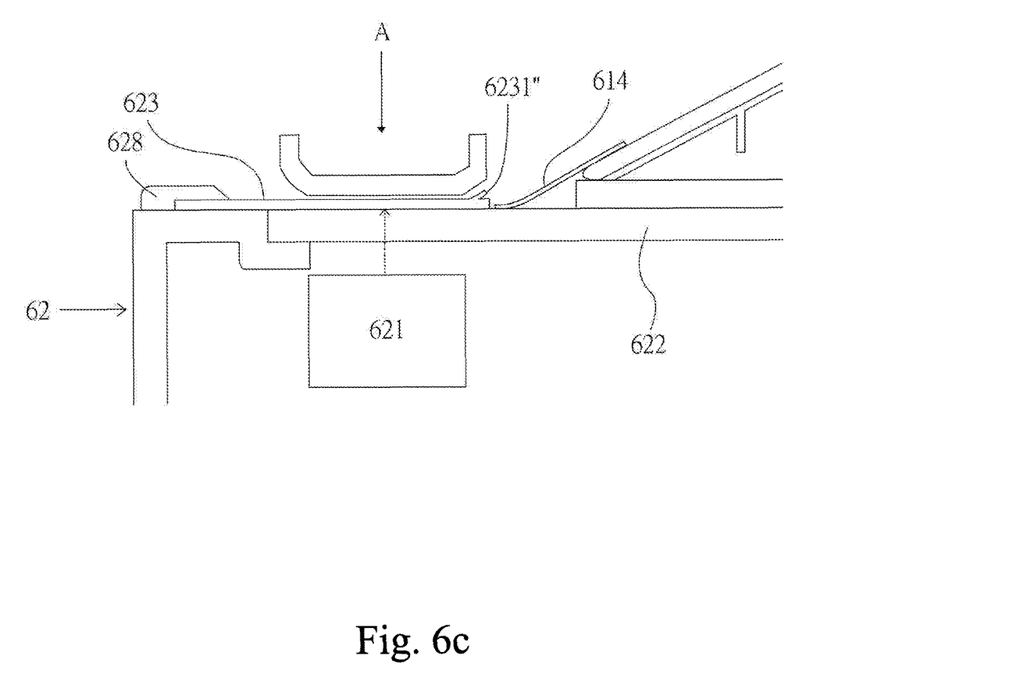
FIG. 6c is another schematic view illustrating the scanning device of the fourth embodiment in the present disclosure.
Figure 6D:
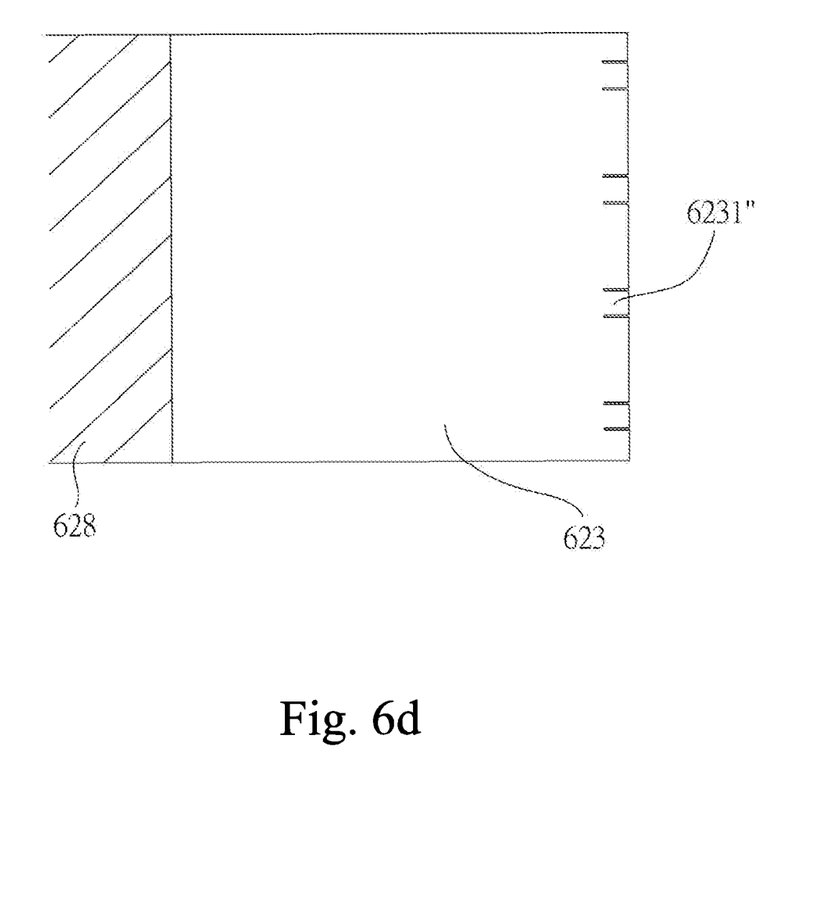
FIG. 6d a plane schematic view illustrating the scanning device depicted in FIG. 6c.

FIG. 6a is a schematic view illustrating the scanning device of the fourth embodiment in the present disclosure. FIG. 6b is another schematic view illustrating the scanning device of the fourth embodiment in the present disclosure. FIG. 6c is another schematic view illustrating the scanning device of the fourth embodiment in the present disclosure. FIG. 6d a plane schematic view illustrating the scanning device depicted in FIG. 6c. Referring to FIG. 6a firstly, in the embodiment of FIG. 6a, multiple protrusions 6231 are formed on the first film 623 closed to endpoint of the second film 614 for resulting endpoint height of the first film 623 is higher than endpoint height of the second film 614. Relatively, another endpoint of the first film 623 can be fixed by the cover 628, and the first film 623 can be fixed on transparent substrate 622 more stably. As shown in FIG. 6a, the structure of the protrusion 6231 is design in bottom of the first film 623. When the first film 623 having protrusion 6231 attaches on the transparent substrate 622, endpoint of the first film 623 will present a warping state, and results endpoint height of the first film 623 is higher than height of second film 614.

In FIG. 6b, the structure of protrusion 6231' is formed on top of the first film 623. When the first film 623 attaches on the transparent substrate 622, height of protrusion 6231' formed on endpoint of the first film 623 is higher than height of the second film 614.

In FIG. 6c-FIG. 6d, endpoint of the first film 623 which being close to the second film 614 be cut to form multiple lifting portions 6231", these spaced lifting portion 6231" are bended toward the same direction to form protruding structures with the design of upward warping.

In FIG. 6a-FIG. 6d, thickness of the first film 623 is equal to thickness of the second film 614, or thickness of the first film 623 is thicker than thickness of the second film. Worth mention, through the endpoint design of first film 623, endpoint of the first film 623 is higher than endpoint of the second film 614 in the adjacent first film 623 and second film 614.

Figure 7:
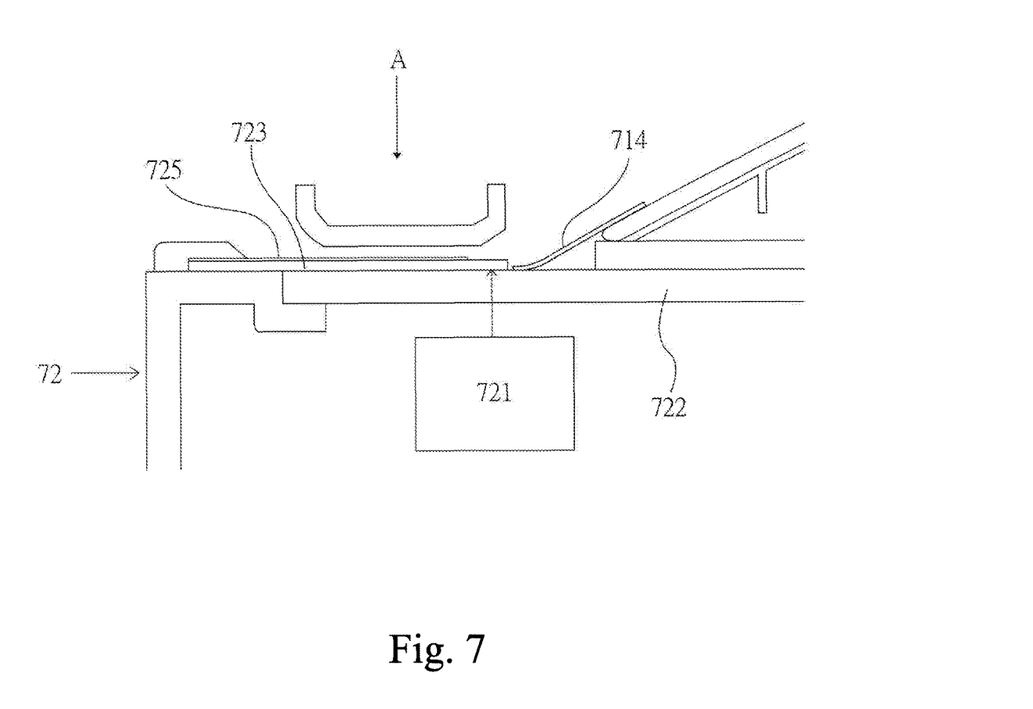
FIG. 7 is a schematic view illustrating the scanning device of the fifth embodiment in the present disclosure.

Referring to FIG. 7, FIG. 7 is a schematic view illustrating the scanning device of the fifth embodiment in the present disclosure. The present disclosure further comprises a third film 725 disposed on top surface of the first film 723. Wherein, total thickness of the first film 723 and the third film 725 is larger than thickness of the second film 714. In addition, area of the third film 725 is smaller than area of the first film 723, and a offset in thickness is formed between the assembly of the first film 723 and the third film 725 and second film 721. Worth mention, the image capturing module 721 can process the image capturing operation of papers through the non-overlapping location between the first film 723 and the third film 725. At this time, the first film 723 is transparent, and has a good transmittance. In another embodiment, the image capturing module 721 can process the image capturing operation of papers through the overlapping location between the first film 723 and the third film 725. At this time, the first film 723 and the third film 725 are transparent, and have a good transmittance.

Worth mention, in the first embodiment, the second embodiment, the fourth embodiment, and the fifth embodiment of the present disclosure, at least one of the first film and the second film is transparent, and has a good transmittance. Wherein, the film having a good transmittance is disposed in the location corresponding to the image capturing module.

Worth mention, in the present disclosure, the first film can be a thin substrate. The first film is, glass substrate or, polyester film (mylar), for example. Certainly, the first film also can be a flexible film.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A scanning device, comprising:
a flatbed scanner, comprising:
a first body;
a transparent substrate, disposed on top surface of the first body;
a first film, disposed at a first end of top surface of the transparent substrate;
a image capturing module, disposed at the first end of bottom surface of the transparent substrate;
a auto document feeder, comprising:
a second body;
a backplane, disposed at bottom of the second body for covering top surface of the flatbed scanner;
a paper passage, disposed inside the second body, and a open portion is configured in the location corresponding to the first end of top surface of the transparent substrate for resulting communication between the paper passage and top surface of the transparent substrate; and
a second film, disposed at paper entrance of the open portion;
wherein, the first film and the second film are not overlap on top surface of the transparent substrate;
wherein, when the backplane covers top surface of the flatbed scanner, endpoint of the first film is higher than endpoint of the second film which being close to the first film, and when papers are transported in the paper passage, papers pass through the first film located in the open portion, and then return to the paper passage through the disposition of the second film.

2. The scanning device of claim 1, further comprising a adhesive layer disposed between the first film and the transparent substrate.

3. The scanning device of claim 2, wherein the flatbed scanner further comprising a housing applied for carrying the transparent substrate.

4. The scanning device of claim 3, wherein the flatbed scanner further comprising a cover, one end of the cover is wedged on the housing, another end of the cover presses on the partial of the first film.

5. The scanning device of claim 1, wherein thickness of the first film is between 0.2-0.5 mm.

6. The scanning device of claim 1, wherein the second film is a flexible film.

7. The scanning device of claim 5, wherein thickness of the second film is less than thickness of the first film.

8. The scanning device of claim 1, wherein at least one of the first film and the second film is transparent material.

9. The scanning device of claim 1, wherein when the image capturing module is disposed on the surface of the transparent substrate which being opposite the first film for capturing image of papers transported in the paper passage, the first film is a transparent film.

10. The scanning device of claim 1, wherein when the image capturing module is disposed on the surface of the transparent substrate which being opposite the second film for capturing image of papers transported in the paper passage, the second film is a transparent film.

11. The scanning device of claim 1, wherein the image capturing module is disposed on the surface of the transparent substrate which being opposite the non-overlapping location between the first film and the second film for capturing image of papers transported in the paper passage.

12. The scanning device of claim 1, wherein multiple protrusions are formed on the first film closed to the second film for resulting the endpoint height of the first film is higher than the endpoint height of the second film.

13. The scanning device of claim 1, wherein further comprising a third film disposed on top surface of the first film, and total thickness of the first film and the third film is larger than thickness of the second film.

* * * * *